(12) United States Patent
Sahin et al.

(10) Patent No.: US 9,838,227 B2
(45) Date of Patent: Dec. 5, 2017

(54) JOINT PRECODING AND MULTIVARIATE BACKHAUL COMPRESSION FOR THE DOWNLINK OF CLOUD RADIO ACCESS NETWORKS

(71) Applicants: InterDigital Patent Holdings, Inc., Wilmington, DE (US); New Jersey Institute of Technology, Newark, NJ (US)

(72) Inventors: Onur Sahin, London (GB); Seok-Hwan Park, Millburn, NJ (US); Osvaldo Simeone, New York City, NY (US); Ariela Zeira, Huntington, NY (US)

(73) Assignees: InterDigital Patent Holdings, Inc., Wilmington, DE (US); New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 14/783,596

(22) PCT Filed: Apr. 9, 2014

(86) PCT No.: PCT/US2014/033517
§ 371 (c)(1),
(2) Date: Oct. 9, 2015

(87) PCT Pub. No.: WO2014/169048
PCT Pub. Date: Oct. 16, 2014

(65) Prior Publication Data
US 2016/0087820 A1 Mar. 24, 2016

Related U.S. Application Data

(60) Provisional application No. 61/810,129, filed on Apr. 9, 2013.

(51) Int. Cl.
*H04K 1/02* (2006.01)
*H04L 25/03* (2006.01)
(Continued)

(52) U.S. Cl.
CPC ......... *H04L 25/03904* (2013.01); *H04B 1/66* (2013.01); *H04B 7/0456* (2013.01); *H04L 25/03961* (2013.01); *H04W 84/045* (2013.01)

(58) Field of Classification Search
CPC ................ H03F 1/3247; H03F 1/3294; H03F 2201/3233; H04L 27/368; H04L 25/03343
(Continued)

(56) References Cited

U.S. PATENT DOCUMENTS 6,801,582 B2 * 10/2004 Hovakimyan ........ H03F 1/3247
375/285
6,882,217 B1 * 4/2005 Mueller ................ H03F 1/3241
330/149

(Continued)

OTHER PUBLICATIONS

Andrews, Jeffrey G., "Seven Ways that HetNets are a Cellular Paradigm Shift", IEEE Communications Magazine, Mar. 2013, pp. 136-144.
(Continued)

*Primary Examiner* — James M Perez
(74) *Attorney, Agent, or Firm* — Condo Roccia Koptiw LLP

(57) ABSTRACT

Signals transmitted on the backhaul links of a cloud radio access network may be compressed using joint compression encoding. Joint compression encoding may be performed using a successive estimation-compression architecture. Joint compression encoding may include designing precoding matrices that may be used with signal compression. Joint compression encoding may be applied to signals transmitted on the downlink of the cloud radio access network. One or more baseband signals to be delivered over the backhaul
(Continued)

links may be jointly compressed using multivariate compression. Multivariate compression may be implemented using successive compression based on a sequence of minimum mean squared error (MMSE) estimations and per BS compression.

12 Claims, 9 Drawing Sheets

(51) Int. Cl.
*H04L 25/49* (2006.01)
*H04B 7/0456* (2017.01)
*H04B 1/66* (2006.01)
*H04W 84/04* (2009.01)

(58) Field of Classification Search
USPC .............................................. 375/259–352
See application file for complete search history.

(56) References Cited

U.S. PATENT DOCUMENTS

| | | | | |
|---|---|---|---|---|
| 7,170,926 B2* | 1/2007 | Zeira | H04B 7/0613 | 370/210 |
| 7,447,255 B2* | 11/2008 | De | H04B 1/7105 | 375/147 |
| 7,460,580 B2* | 12/2008 | Pan | H04B 1/7105 | 370/479 |
| 7,529,305 B1* | 5/2009 | Tong | H04L 1/0618 | 375/260 |
| 7,620,096 B2* | 11/2009 | Bar-Ness | H04W 52/20 | 375/144 |
| 7,630,337 B2* | 12/2009 | Zheng | H04B 7/0452 | 370/329 |
| 7,724,835 B2* | 5/2010 | Naguib | H04L 1/0618 | 375/267 |
| 7,903,609 B2* | 3/2011 | Zheng | H04B 7/0452 | 370/329 |
| 8,000,421 B2* | 8/2011 | Takano | H04B 7/02 | 375/260 |
| 8,325,844 B2* | 12/2012 | Walton | H04B 7/0417 | 375/130 |
| 8,451,944 B2* | 5/2013 | Gaur | H04B 7/0426 | 375/296 |
| 8,576,896 B2* | 11/2013 | Bar-Ness | H04L 1/0631 | 375/219 |
| 8,693,416 B2* | 4/2014 | Zheng | H04B 7/0452 | 370/329 |
| 8,861,637 B2* | 10/2014 | Na | H04L 25/03343 | 375/232 |
| 8,976,850 B2* | 3/2015 | Clerckx | H04B 7/0626 | 375/213 |
| 9,106,297 B2* | 8/2015 | To | H04B 7/0452 | |
| 9,124,313 B2* | 9/2015 | Ko | H04B 7/024 | |
| RE45,807 E * | 11/2015 | Agee | H04B 7/0413 | |
| 9,191,080 B2* | 11/2015 | Yokomakura | H04B 7/0413 | |
| 9,319,197 B2* | 4/2016 | Sahin | H04L 1/0025 | |
| 9,374,141 B2* | 6/2016 | Murakami | H04B 7/04 | |
| 2002/0054621 A1* | 5/2002 | Kyeong | H04B 7/01 | 375/147 |
| 2003/0021249 A1* | 1/2003 | Kim | H04B 1/7105 | 370/335 |
| 2004/0095907 A1* | 5/2004 | Agee | H04B 7/0417 | 370/334 |
| 2004/0116122 A1* | 6/2004 | Zeira | H04B 1/71075 | 455/445 |
| 2004/0141565 A1* | 7/2004 | Kwak | H04B 1/71055 | 375/267 |
| 2005/0025267 A1* | 2/2005 | Reznik | H04B 1/71052 | 375/346 |
| 2005/0031024 A1* | 2/2005 | Yang | H04L 25/03292 | 375/219 |
| 2005/0063500 A1* | 3/2005 | Li | H04B 1/7113 | 375/350 |
| 2005/0075081 A1* | 4/2005 | Catreux-Erceg | H04B 7/061 | 455/78 |
| 2005/0100120 A1* | 5/2005 | Barton | H04B 7/0613 | 375/347 |
| 2005/0101353 A1* | 5/2005 | Zeira | H01Q 1/246 | 455/562.1 |
| 2005/0157809 A1* | 7/2005 | Yuk | H04L 1/005 | 375/267 |
| 2006/0146725 A1* | 7/2006 | Li | H04B 7/0617 | 370/252 |
| 2007/0015543 A1* | 1/2007 | Ojard | H01Q 21/00 | 455/562.1 |
| 2007/0064632 A1* | 3/2007 | Zheng | H04B 7/0452 | 370/281 |
| 2007/0064829 A1* | 3/2007 | Zheng | H04B 7/0452 | 375/267 |
| 2007/0066237 A1* | 3/2007 | Zhang | H04B 7/0452 | 455/69 |
| 2007/0066331 A1* | 3/2007 | Zheng | H04B 7/0408 | 455/513 |
| 2007/0149117 A1* | 6/2007 | Hwang | H04B 7/1555 | 455/11.1 |
| 2007/0191066 A1* | 8/2007 | Khojastepour | H04B 7/0408 | 455/562.1 |
| 2008/0096488 A1* | 4/2008 | Cho | H04B 7/0632 | 455/69 |
| 2008/0112504 A1* | 5/2008 | Jiang | H04L 1/0618 | 375/296 |
| 2009/0075686 A1* | 3/2009 | Gomadam | H04B 7/0417 | 455/500 |
| 2009/0196224 A1* | 8/2009 | Zhang | H04B 7/0452 | 370/328 |
| 2009/0232191 A1* | 9/2009 | Gupta | H04L 27/2096 | 375/216 |
| 2009/0264087 A1* | 10/2009 | Chae | H04B 7/0408 | 455/114.2 |
| 2009/0280760 A1* | 11/2009 | Ohwatari | H04B 7/0417 | 455/127.2 |
| 2009/0280855 A1* | 11/2009 | Ohwatari | H04B 7/0417 | 455/522 |
| 2009/0280856 A1* | 11/2009 | Ohwatari | H04B 7/0417 | 455/522 |
| 2009/0285271 A1* | 11/2009 | Perez De Aranda Alonso | H04L 25/03133 | 375/219 |
| 2009/0285325 A1* | 11/2009 | Zhou | H04B 7/0854 | 375/267 |
| 2010/0091675 A1* | 4/2010 | Sawai | H04B 7/063 | 370/252 |
| 2010/0150013 A1* | 6/2010 | Hara | H04L 25/0224 | 370/252 |
| 2010/0150036 A1* | 6/2010 | Zheng | H04B 7/0452 | 370/281 |
| 2010/0157901 A1* | 6/2010 | Sanderovitz | H04B 7/022 | 370/328 |
| 2010/0208712 A1* | 8/2010 | Wax | H04B 17/345 | 370/338 |
| 2010/0246377 A1* | 9/2010 | Zhang | H04B 7/0617 | 370/210 |
| 2010/0272211 A1* | 10/2010 | Ohwatari | H04B 7/0426 | 375/295 |
| 2011/0007850 A1* | 1/2011 | Cao | H04B 7/0408 | 375/340 |
| 2011/0063989 A1* | 3/2011 | Yang | H04B 7/022 | 370/252 |
| 2011/0199926 A1* | 8/2011 | Zheng | H04B 7/0452 | 370/252 |
| 2012/0249370 A1* | 10/2012 | Okamoto | H01Q 3/2611 | 342/377 |
| 2012/0269280 A1* | 10/2012 | Li | H04B 7/0417 | 375/267 |
| 2013/0064150 A1* | 3/2013 | Hirata | H04B 7/0665 | 370/310 |

(56) References Cited

U.S. PATENT DOCUMENTS

| | | | | |
|---|---|---|---|---|
| 2013/0343481 | A1* | 12/2013 | Zhang | H04B 7/0456 375/295 |
| 2014/0064354 | A1* | 3/2014 | Nakano | H04L 25/03955 375/233 |
| 2014/0146904 | A1* | 5/2014 | Onodera | H04B 7/0417 375/267 |
| 2014/0177763 | A1* | 6/2014 | Tomeba | H04L 25/0212 375/340 |
| 2014/0204841 | A1* | 7/2014 | Ruiz Delgado | H04B 7/0689 370/328 |
| 2014/0293904 | A1* | 10/2014 | Dai | H04B 7/024 370/329 |
| 2015/0171950 | A1* | 6/2015 | Phan Huy | H04B 7/0697 370/329 |
| 2015/0230266 | A1* | 8/2015 | Sung | H04B 7/0413 370/329 |
| 2015/0236771 | A1* | 8/2015 | Pan | H04B 7/0486 375/267 |
| 2015/0245373 | A1* | 8/2015 | Kim | H04W 72/1226 370/329 |

OTHER PUBLICATIONS

Beck et al., "Gradient-Based Algorithms With Applications to Signal Recovery Problems", Convex Optimization in Signal Processing and Communications, Edited by Y. Eldar and D. Palomar, Cambridge University Press, 2010, pp. 42-48.

Bjornson et al., "Optimal Resource Allocation in Coordinated Multi-Cell Systems", Foundations and Trends in Communications and Information Theory, vol. 9, Nos. 2-3, 2013, pp. 113-381.

Boyd et al., "Convex Optimization", Cambridge University Press, 2004, pp. 1-730.

Chandrasekhar et al., "Femtocell Networks: a Survey", IEEE, Communications Magazine, vol. 46, No. 9, Sep. 12, 2008, pp. 59-67.

China Mobile, "C-Ran: the Road Towards Green Ran", White Paper, V2.5, China Mobile Research Institute, Oct. 2011, pp. 1-48.

Coso et al., "Distributed Compression for Mimo Coordinated Networks With a Backhaul Constraint", IEEE Transactions on Wireless Communications, vol. 8, No. 9, Sep. 2009, pp. 4698-4709.

Costa, M.H.M, "Writing on Dirty Paper (Corresp.)", IEEE Transactions on Information Theory, vol. 29, no. 3, May 1983, pp. 439-441.

Erez et al., "A Close-to-Capacity Dirty Paper Coding Scheme", IEEE Transactions on Information Theory, vol. 51, No. 10, Oct. 2005, pp. 3417-3432.

Ericsson, "Heterogeneous Networks", Ericsson White Paper, Feb. 2012.

Flanagan, Tom, "Creating Cloud Base Stations With Ti's Keystone Multicore Architecture", White Paper, Texas Instruments, Oct. 2011, pp. 1-9.

Forney Jr., G. D., "Shannon Meets Wiener Ii: on Mmse Estimation in Successive Decoding Schemes", Available at http://arxiv.org/pdf/cs/0409011.pdf, Sep. 26, 2004, pp. 1-9.

Gesbert et al., "Multi-Cell Mimo Cooperative Networks: a New Look at Interference", IEEE Journal on Selected Areas in Communications, vol. 28, No. 9, Dec. 2010, pp. 1380-1408.

Grieger et al., "Large Scale Field Trial Results on Frequency Domain Compression for Uplink Joint Detection", IEEE Globecom Workshops (Gc Wkshps), Anaheim, Ca, Dec. 3-7, 2012, pp. 1128-1133.

Hong et al., "Decomposition by Successive Convex Approximation: a Unifying Approach for Linear Transceiver Design in Interfering Heterogeneous Networks", Available at http://arxiv.org/pdf/1210.1507v1.pdf, Oct. 4, 2012, pp. 1-41.

Hong et al., "Joint Base Station Clustering and Beamformer Design for Partial Coordinated Transmission in Heterogeneous Networks", IEEE Journal on Selected Areas in Communications, vol. 31, No. 2, Feb. 2013, pp. 226-240.

Hong et al., "Quantized Compute and Forward: a Low-Complexity Architecture for Distributed Antenna Systems", IEEE Information Theory Workshop (Itvv), Paraty, Brazil, Oct. 16-20, 2011, pp. 420-424.

Hong et al., "Reverse Compute and Forward: a Low-Complexity Architecture for Downlink Distributed Antenna Systems", IEEE International Symposium on Information Theory Proceedings (Isit), Cambridge, Ma, Jul. 1-6, 2012, pp. 1147-1151.

Huh et al., "Multiuser Miso Transmitter Optimization for Intercell Interference Mitigation", IEEE Transactions on Signal Processing, vol. 58, No. 8, Apr. 19, 2010, pp. 4272-4285.

Intel, "Intel Heterogeneous Network Solution Brief", Solution Brief, Intel Core Processor, Telecommunications Industry, 2011, pp. 1-5.

Lee et al., "High Snr Analysis for Mimo Broadcast Channels: Dirty Paper Coding Versus Linear Precoding", IEEE Transactions on Information Theory, vol. 53, No. 12, Dec. 2007, pp. 4787-4792.

Lim et al., "Noisy Network Coding", IEEE Transactions on Information Theory, vol. 57, No. 5, May 2011, pp. 3132-3152.

Liu et al., "A 25 Gb/s(/km ) Urban Wireless Network Beyond Imt-Advanced", IEEE, Communications Magazine, vol. 49 , No. 2, Feb. 2011, pp. 122-129.

Loyka et al., "On the Compound Capacity of a Class of Mimo Channels Subject to Normed Uncertainty", IEEE Transactions on Information Theory, vol. 58, No. 4, Apr. 2012, pp. 2048-2063.

Maric et al., "Resource Allocation for Constrained Backhaul in Picocell Networks", Information Theory and Applications Workshop (Ita), La Jolla, Ca, Feb. 6-11, 2011, pp. 1-6.

Marsch et al., "On Downlink Network Mimo Under a Constrained Backhaul and Imperfect Channel Knowledge", IEEE Global Telecommunications Conference, Globecom, Honolulu, Hawaii, Nov. 30, 2009, pp. 1-6.

Nazer et al., "Structured Superposition for Backhaul Constrained Cellular Uplink", IEEE International Symposium on Information Theory, ISIT, Seoul, Korea, Jun. 28, 2009, pp. 1530-1534.

Ng et al., "Distributed Downlink Beamforming with Cooperative Base Stations", IEEE Transactions on Information Theory vol. 54, No. 12, Dec. 2008, pp. 5491-5499.

Ng et al., "Linear Precoding in Cooperative Mimo Cellular Networks with Limited Coordination Clusters", IEEE Journal on Selected Areas in Communications, vol. 28, No. 9, Oct. 4, 2010, pp. 1446-1454.

Park et al., "Joint Precoding and Multivariate Backhaul Compression for the Downlink of Cloud Radio Access Networks", IEEE Transactions on Signal Processing, vol. 61, No. 22, Nov. 15, 2013, pp. 5646-5658.

Park et al., "Robust and Efficient Distributed Compression for Cloud Radio Access Networks", IEEE Transactions on Vehicular Technology, vol. 62 , No. 2, Feb. 12, 2013, pp. 692-703.

Sanderovich et al., "Distributed Mimo Receiver—Achievable Rates and Upper Bounds", IEEE Transactions on Information Theory, vol. 55 , No. 10, Oct. 2009, pp. 4419-4438.

Sanderovich et al., "Uplink Macro Diversity of Limited Backhaul Cellular Network", IEEE Transactions on Information Theory, vol. 55 , No. 8, Aug. 2009, pp. 3457-3478.

Scutari et al., "Decomposition by Partial Linearization: Parallel Optimization of Multi-Agent Systems", Available at http://arxiv.org/pdf/1302.0756v1.pdf, Feb. 4, 2013, pp. 1-12.

Segel et al., "Lightradio Portfolio-Technical Overview", Technology White Paper 1, Alcatel-Lucent, 2011, pp. 1-16.

Shen et al., "Distributed Robust Multicell Coordinated Beamforming with Imperfect CSI: An ADMM Approach", IEEE Transactions on Signal Processing, vol. 60, No. 6, Feb. 22, 2012, pp. 2988-3003.

Simeone et al., "Cooperative Wireless Cellular Systems: An Information-Theoretic View", Foundations and Trends in Communications and Information Theory, vol. 8, Nos. 1-2, 2012, pp. 1-177.

Simeone et al., "Downlink Multicell Processing with Limited-Backhaul Capacity", EURASIP Journal on Advances in Signal Processing, 2009, pp. 1-10.

Tse et al., "Multiaccess Fading Channels-Part I: Polymatroid Structure, Optimal Resource Allocation and Throughput Capacities", IEEE Transactions on Information Theory, vol. 44, No. 7, Nov. 1998, pp. 2796-2815.

(56) References Cited

OTHER PUBLICATIONS

Zakhour et al., "Optimized Data Sharing in Multicell MIMO with Finite Backhaul Capacity", IEEE Transactions on Signal Processing, vol. 59, No. 12, Aug. 25, 2011, pp. 6102-6111.
Zhang et al., "On Gaussian MIMO BC-MAC Duality with Multiple Transmit Covariance Constraints", IEEE Transactions on Information Theory, vol. 58, No. 4, Apr. 2012, pp. 2064-2078.
Zhang et al., "Successive Coding in Multiuser Information Theory", IEEE Transactions on Information Theory, vol. 53, No. 6, Jun. 2007, pp. 2246-2254.
Zhang, Rui, "Cooperative Multi-Cell Block Diagonalization with Per-Base-Station Power Constraints", IEEE Journal on Selected Areas in Communications, vol. 28, No. 9, Dec. 2010, pp. 1435-1445.
Zhou et al., "Uplink Multicell Processing with Limited Backhaul via Successive Interference Cancellation", IEEE, Communication Theory Symposium, Globecom, Dec. 3-7, 2012, pp. 2322-2327.
Gamal et al., "Lecture Notes Network Information Theory", Department of Electrical Engineering, Stanford University, Jun. 22, 2010, 640 pages.
Marsch et al., "Future Mobile Communication Networks: Challenges in the Design and Operation", IEEE, Vehicular Technology Magazine, vol. 7, No. 1, Mar. 2012, pp. 16-23.
Sohn et al., "Belief Propagation for Distributed Downlink Beamforming in Cooperative MIMO Cellular Networks", IEEE Transactions on Wireless Communications, vol. 10, No. 12, Dec. 2011, pp. 4140-4149.

\* cited by examiner

JOINT PRECODING AND MULTIVARIATE BACKHAUL COMPRESSION FOR THE DOWNLINK OF CLOUD RADIO ACCESS NETWORKS

CROSS-REFERENCE TO RELATED APPLICATIONS

This application claims priority to U.S. provisional patent application No. 61/810,129, filed Apr. 9, 2013, which is incorporated herein by reference in its entirety.

BACKGROUND

As demand for wireless communication spectrum continues to increase, for example demand associated with applications executing on smart phones, spectrum shortages may occur. Spectrum shortages may detrimentally affect the performance of such applications. Techniques may be implemented to mitigate the impact of such spectrum shortages.

One approach to mitigating such spectrum shortages is to increase the density of spectrum available to wireless communication devices. For example, spectrum density may be increased by implementing heterogeneous, multi-tiered networks. Such heterogeneous networks may include a number of distributed macrocell base stations (BS). Within the coverage area of a macrocell, one or more other sources of wireless communication spectrum may be defined, such as one or more femtocells, picocells, microcells, remote radio heads, and the like.

SUMMARY

Signals transmitted on the backhaul links of a cloud radio access network may be compressed using joint compression encoding, for example as described herein. The example joint compression encoding may be performed using a successive estimation-compression architecture. The example joint compression encoding may include designing precoding matrices that may be used with signal compression. The example joint compression encoding may be applied to signals transmitted on the downlink of the cloud radio access network. One or more baseband signals to be delivered over the backhaul links may be jointly compressed using multivariate compression. Multivariate compression may be implemented using successive compression based on a sequence of minimum mean squared error (MMSE) estimations and per BS compression.

An example central encoding device may include a processor and a memory comprising instructions. The example central encoding device may be associated with a cloud radio access network. The instructions, when executed by the processor, may cause the example central encoding device to perform one or more of the following. The central encoding device may precode a first signal into a first precoded signal and to precode a second signal into a second precoded signal. The central encoding device may quantize the first precoded signal into a first quantized signal. The central encoding device may generate an MMSE estimate based on the first quantized first signal and the second precoded signal. The central encoding device may quantize the second precoded signal into a second quantized signal. Quantizing the second precoded signal may include applying the MMSE estimate to the second precoded signal. The central encoding device may transmit the first and second quantized signals. The central encoding device may design a first optimized precoding matrix for the first signal and to apply the first optimized precoding matrix to the first signal while precoding the first signal.

DETAILED DESCRIPTION

Figure 1A:
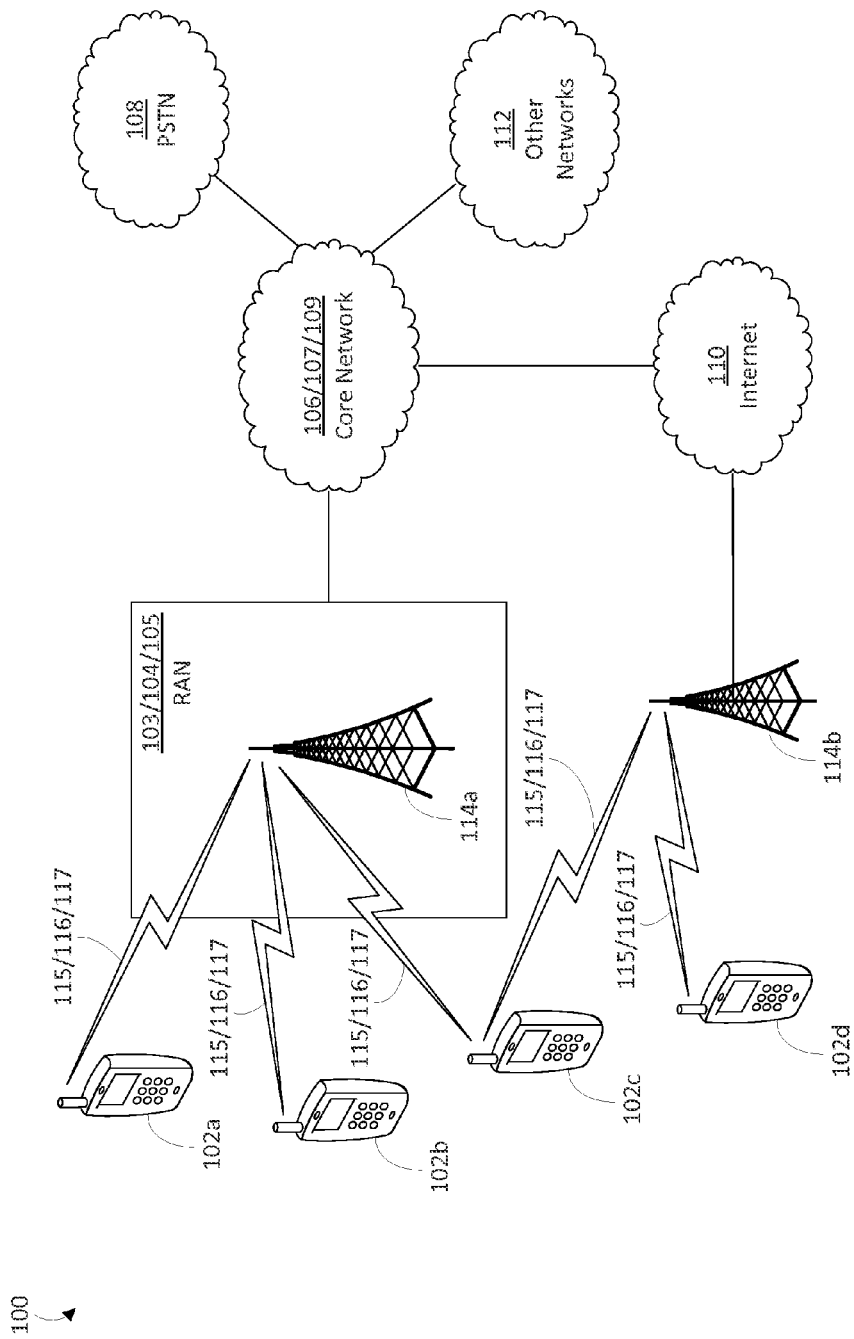
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. A WTRU and user equipment (UE) may be interchangeably used herein. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include wireless transmit/receive unit (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c. 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a. 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers. i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b. 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an embodiment, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM). Enhanced Data rates for GSM Evolution (EDGE). GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c. 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b. 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with a RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include a core network connected to one or more RANs, which may employ the same RAT as the RAN 103/104/105 or a different RAT.

Some or all of the WTRUs 102a. 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
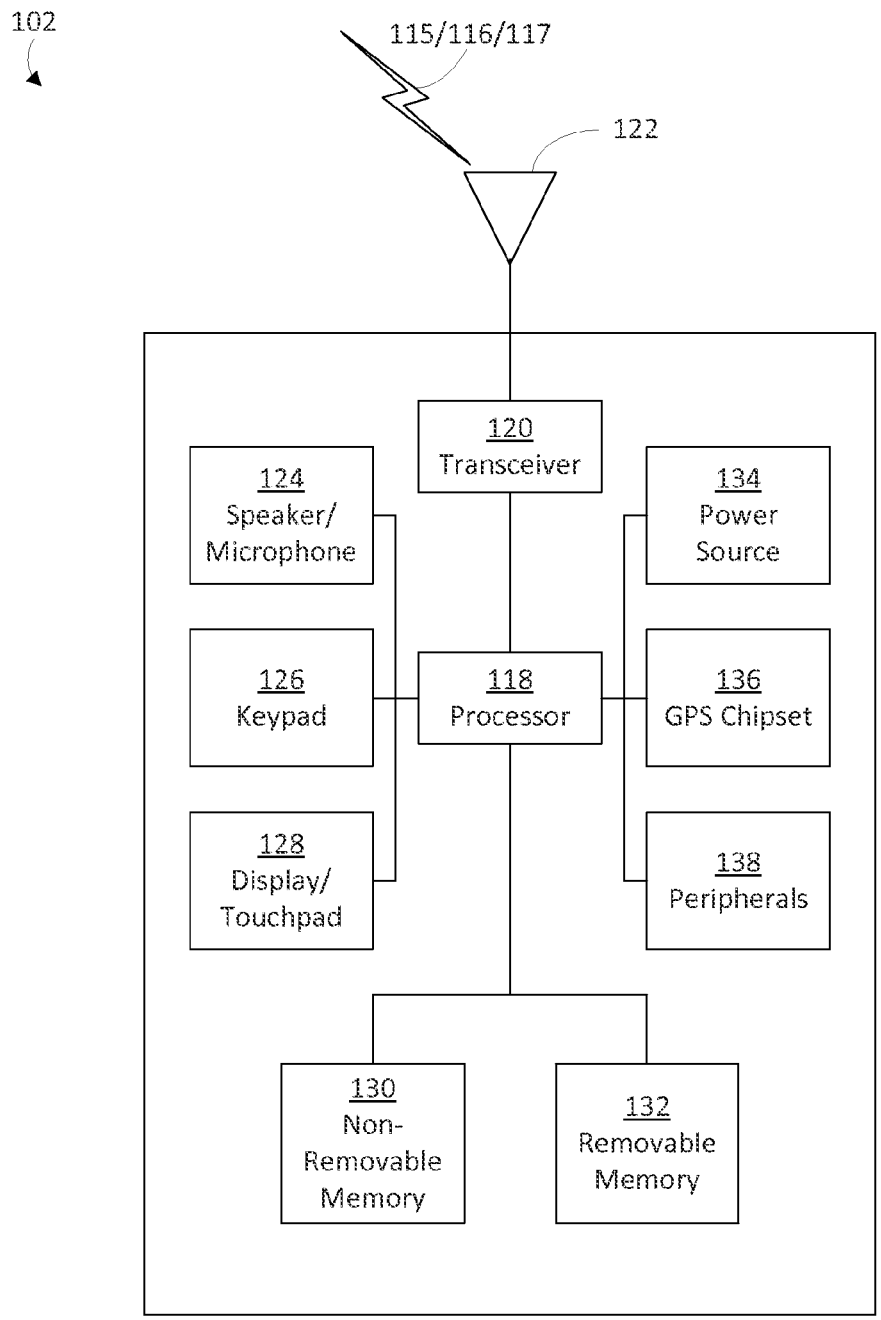
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

A processor, such as the processor 118, may include integrated memory (e.g., WTRU 102 may include a chipset that includes a processor and associated memory). Memory may refer to memory that is integrated with a processor (e.g., processor 118) or memory that is otherwise associated with a device (e.g., WTRU 102). The memory may be non-transitory. The memory may include (e.g., store) instructions that may be executed by the processor (e.g., software and/or firmware instructions). For example, the memory may include instructions that when executed may cause the processor to implement one or more of the implementations described herein.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130, the removable memory 132, and/or memory integrated with the processor 118. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
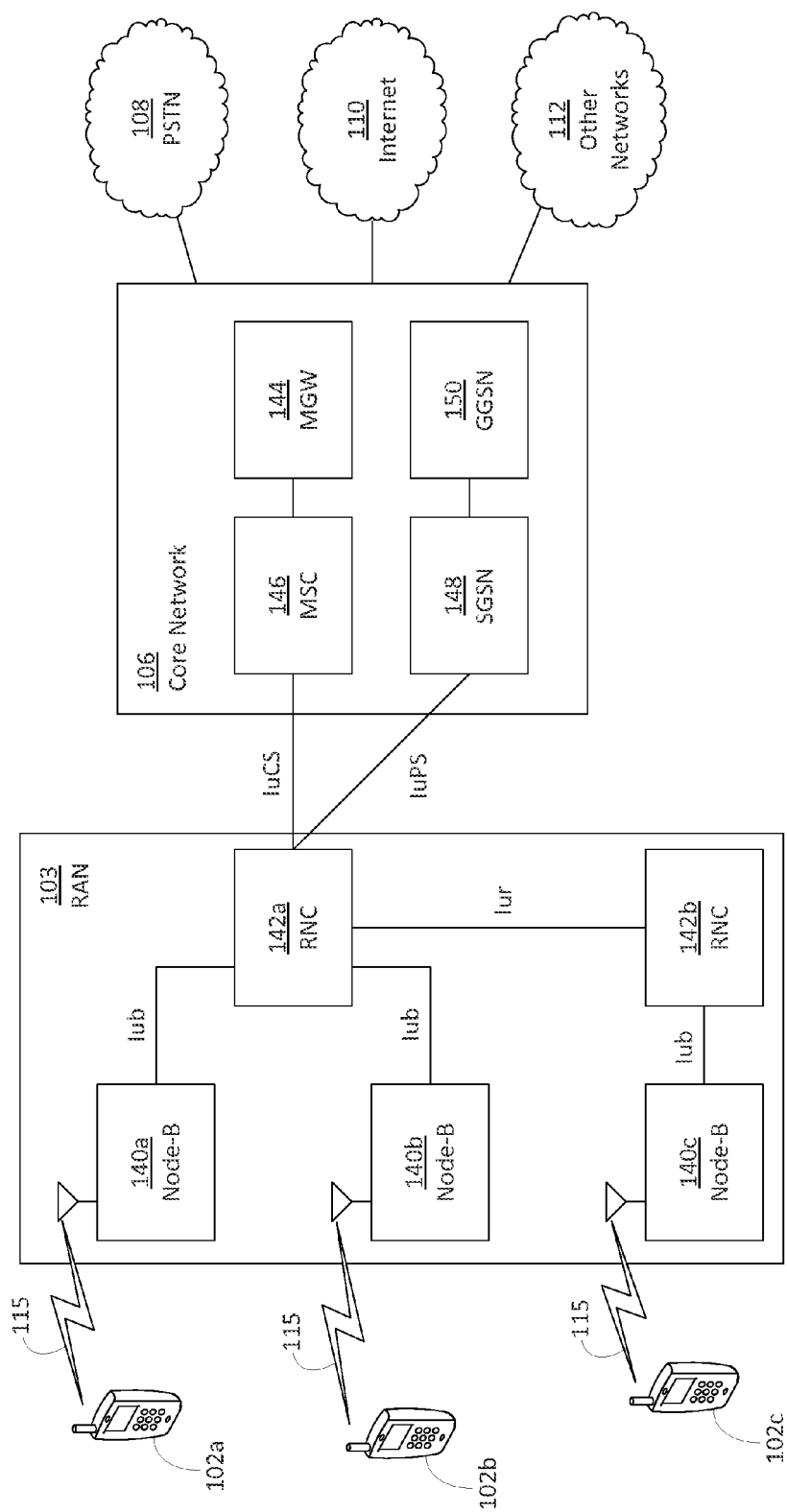
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b. 102c and IP-enabled devices.

As noted above, the core network 106 may also be connected to the networks 112, which may include other wired or wireless networks that are owned and/or operated by other service providers.

Figure 1D:
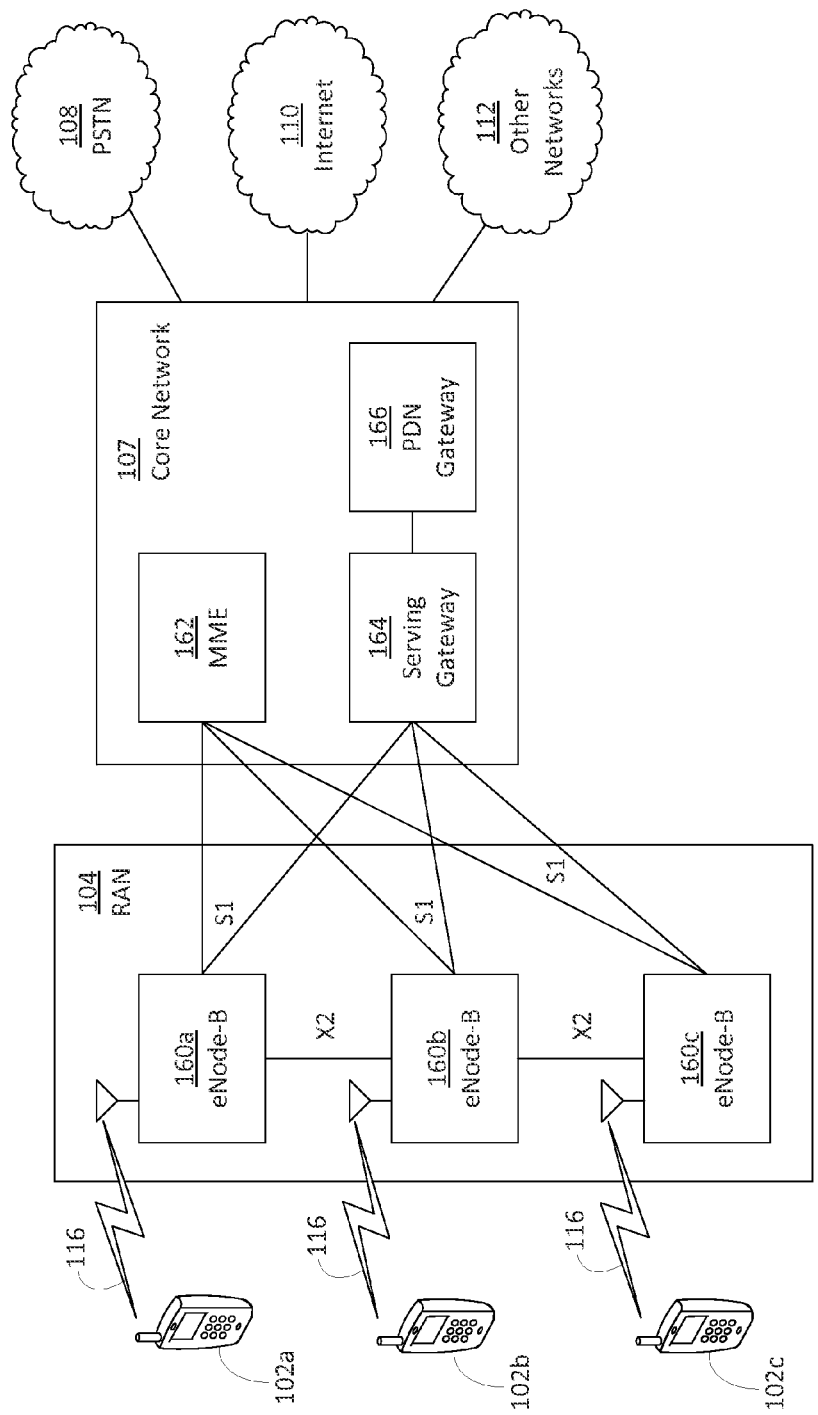
FIG. 1D is a system diagram of an example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b. 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b. 102c over the air interface 116. In one embodiment, the eNode-Bs 160a. 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a. 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a. 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
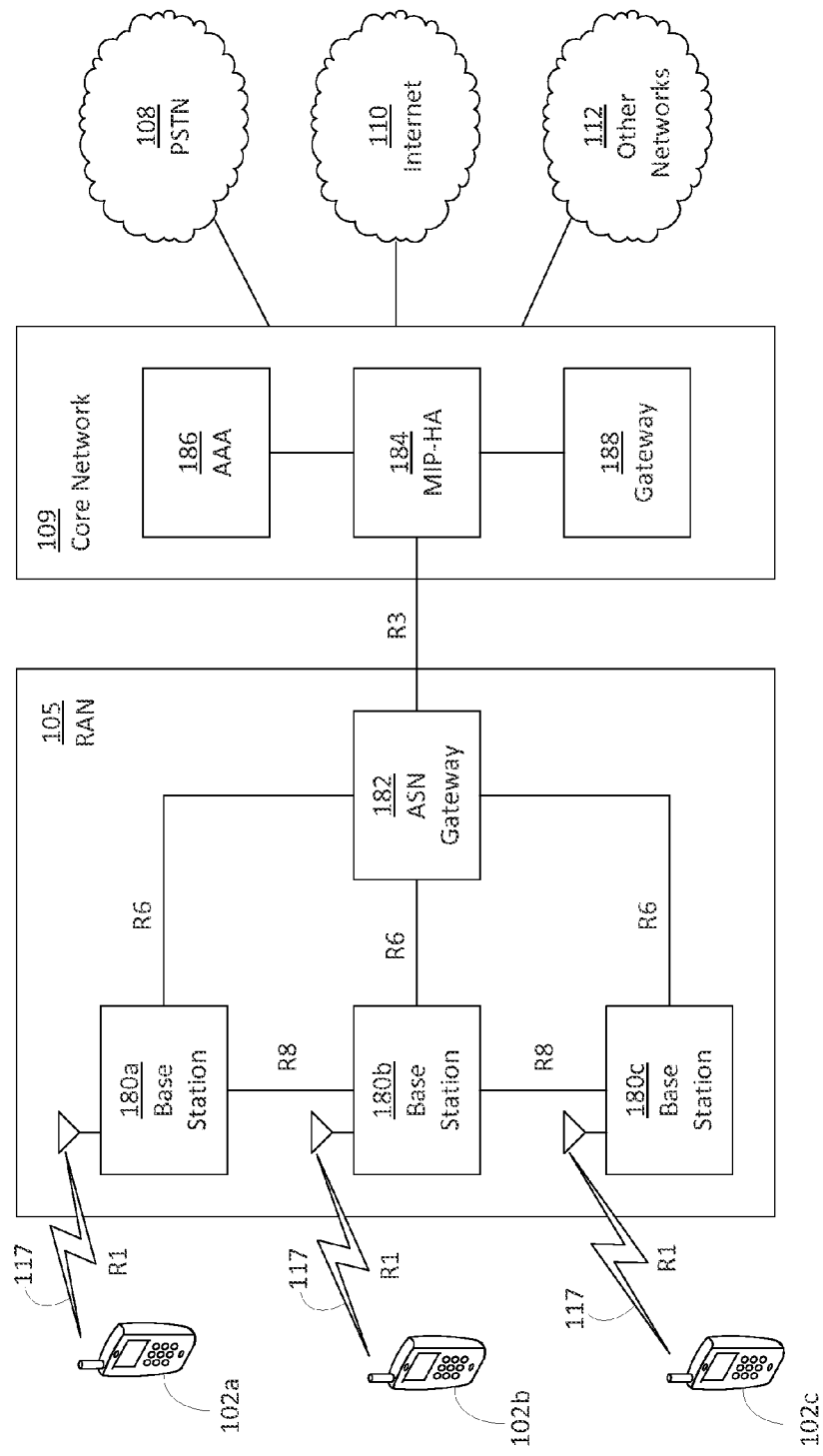
FIG. 1E is a system diagram of an example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

Interference management and/or cell association among various devices of heterogeneous networks may be problematic. To mitigate such problems, cloud radio access networks may be implemented. In such a network, the encoding and/or decoding functions of one or more BSs may be migrated to a central unit. The BSs in such a network may function as soft relays that interface with the central unit, for example via backhaul links that may be used to carry baseband signals. The implementation of cloud radio access networks may mitigate inter-cell interference, and/or may lower costs (e.g., costs related to the deployment and/or management of BSs).

However, such cloud radio access networks may exhibit limitations. For example, one limitation of cloud radio access networks may be the capacity limitations of respective digital backhaul links connecting the BSs to the central unit. The central unit may be configured to individually compress signals transmitted to the respective BSs. However, the efficiency of such a point-to-point compression technique may be limited.

Figure 2:
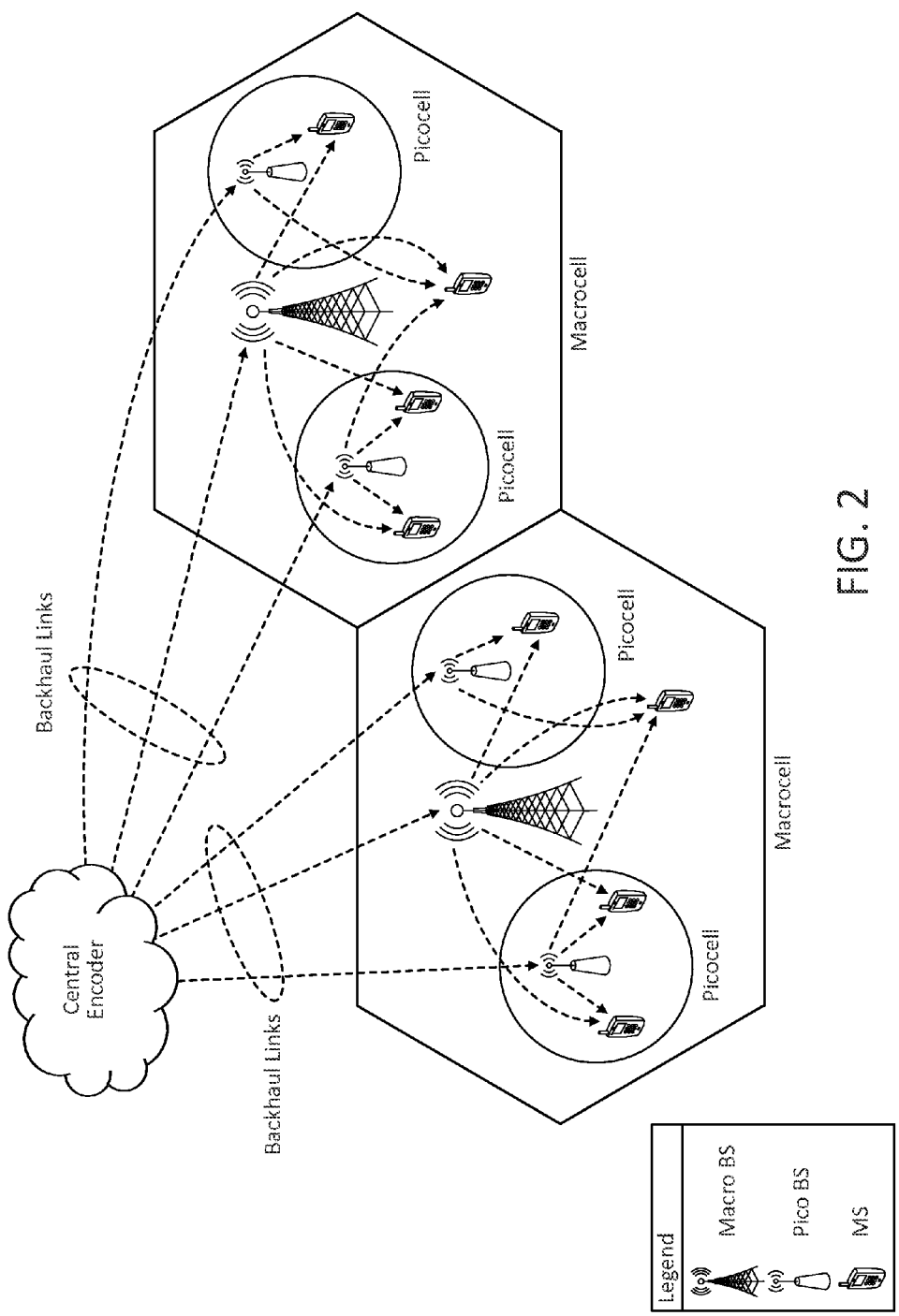
FIG. 2 depicts an example cloud radio access network architecture.

FIG. 2 depicts an example cloud radio access network. The cloud radio access network may be a heterogeneous network. For example, the cloud radio access network may include one or more macrocells. As shown, a macrocell may include a macrocell base station (BS) that may be, for example, a multi-antenna BS. A macrocell BS may be referred to as a macro BS.

Within the coverage area of a macrocell BS, one or more other sources of wireless communication spectrum may be defined, such as one or more femtocells, picocells, microcells, remote radio heads, and the like. As shown, a macrocell in the example cloud radio access network may include one or more small cells (e.g., picocells). A picocell may include a picocell base station (BS) that may be, for example, a multi-antenna BS. A picocell BS may be referred to as a pico BS. A cloud radio access network, such as the example cloud radio access network, may include $N_N$ multi-antenna BSs, which may include, for example, macro BSs, pico BSs, or other BSs.

The illustrated example cloud radio access network may include a central unit that may be responsible for encoding and/or decoding functions of one or more BSs of the cloud radio access network. The central unit may be referred to as a central encoder. The central encoder may be implemented as a standalone network device, or may be a logical entity (e.g., implemented on one or more network devices that may perform other functions). The central encoder may be connected to (e.g., in communication with) the BSs of the cloud radio access network via respective backhaul links. Traffic on the backhaul links may be bidirectional, such that the backhaul links may additionally, or alternatively, be referred to as fronthaul links. The backhaul links may be physical links (e.g., via fiber), wireless links (e.g., via directional microwave), or any combination thereof.

In a cloud radio access network, such as the example cloud radio access network, the BSs (e.g., the macro BSs and/or pico BSs) may operate as soft relays that interface with the central encoder, for example via the backhaul links.

As shown, the example cloud radio access network may include one or more mobile stations (MSs), such as a plurality of MSs, that may be associated with one or more BSs of the cloud radio access network. The MSs may be, for example, multi-antenna MSs. A cloud radio access network, such as the example cloud radio access network, may include NA, multi-antenna MSs. As shown, the $N_M$ mobile stations may be distributed across one or more cells of the cloud radio access network (e.g., across macrocells and/or picocells).

Signals transmitted on the backhaul links of a cloud radio access network, such as the example cloud radio access network, may be compressed using joint compression encoding, for example as described herein. The example joint compression encoding may be performed using a successive estimation-compression architecture. The example joint compression encoding may include designing precoding matrices that may be used with signal compression, such that joint design of precoding and backhaul compression may be provided. The example joint compression encoding may be applied to signals transmitted on the downlink of a cloud radio access network.

Quantization noise signals corresponding to different base stations (BSs) may be correlated with each other. Design of the correlation of the respective quantization noises across BSs may limit the effect of the resulting quantization noise seen at one or more associated mobile stations (MSs). In order to create such correlation, one or more baseband signals to be delivered over the backhaul links may be jointly compressed, for example using multivariate compression. Multivariate compression (e.g., across multiple BSs) may be implemented using successive compression that may be based on a sequence of minimum mean squared error (MMSE) estimations and per BS compression.

Quantization noise signals corresponding to different BSs may be correlated with each other. The correlation of the quantization noises across the BSs may be used to limit the effect of the resulting quantization noise seen at respective MSs. In order to create such correlation, baseband signals delivered over respective backhaul links may be jointly compressed, for example using multivariate compression. Multivariate compression may be implemented without performing joint compression across the BSs (e.g., all BSs) of a cloud radio access network. For example, multivariate compression may be implemented using successive compression based on MMSE estimation and per BS compression.

The central encoder of a cloud radio access network may perform joint encoding of messages intended for one or more mobile stations (MSs) of the network, for example in the downlink of the cloud radio access network. The central encoder may compress (e.g., independently compress) respective produced baseband signals to be transmitted by one or more BSs of the network. The baseband signals may be transmitted to respective BSs, for example via corresponding backhaul links. The BSs may upconvert the received baseband signals, and may transmit the signals, for example via respective antennas, to the MSs.

A central encoder may be configured to perform dirty-paper coding (DPC) of MS signals before compression. The effect of imperfect channel state information (CSI) may be accounted for. Compute-and-forward techniques may be implemented. The backhaul links of a cloud radio access network may be used to transmit message information.

Definitions of mutual information I(X;Y) between the random variables X and Y, conditional mutual information I(X;Y|Z) between X and Y conditioned on random variable Z, differential entropy h(X) of X and conditional differential entropy h(X|Y) of X conditioned on Y may be adopted. The distribution of a random variable X may be denoted by p(x), and the conditional distribution of X conditioned on Y may be represented by p(x|y). Algorithms illustrated and describer herein, unless otherwise specified, may be in base two.

The circularly symmetric complex Gaussian distribution with mean $\mu$ and covariance matrix R may be denoted by $XN(\mu, R)$. The set of M×N complex matrices (e.g., all M×N complex matrices) may be denoted by $X^{M \times N}$, and E(•) may represent the expectation operator. The notation X±0 may be used to indicate that the matrix X is positive semidefinite. The notation $X \succ 0$ may be used to indicate that the matrix X is positive definite. Given a sequence $X_1, \ldots, X_m$, a set $X_\Sigma = \{X_j | j \in \Sigma\}$ may be defined for a subset $\Sigma \subseteq \{1, \ldots, m\}$. The operation $(\bullet)^\dagger$ may denote Hermitian transpose of a matrix or vector. The notation $\Sigma_x$ may be used for the correlation matrix of random vector x, e.g., $\Sigma_x = E[xx^\dagger]$. The cross-correlation matrix, e.g., $\Sigma_{x,y} = E[xy^\dagger]$, may be represented by $\Sigma_{x,y}$. The conditional correlation matrix. e.g., $\Sigma_{x|y} = E[xx^\dagger|y]$, may be represented by $\Sigma_{x|y}$.

FIG. 2 depicts an example of downlink communication in the example cloud radio access network. As shown, the central encoder may communicate to the $N_M$ MSs through the $N_B$ distributed BSs. The message $M_k$ for each k th MS may be distributed (e.g., uniformly) in the set $\{1, \ldots, 2^{nR_k}\}$, where n may be the blocklength and $R_k$ may be the information rate of message $M_k$ (e.g., measured in bits per channel use (c.u.)). Each MS k may have $n_{M,k}$ receive antennas for $k=1, \ldots, N_M$, and each BS i may be equipped with $n_{B,i}$ antennas for $i=1, \ldots, N_B$. The BSs may be macro BSs and/or small cell BSs (e.g., pico BSs, femto BSs, or the like). The MSs may be distributed across the macrcells and/or small cells. Each i th BS may be connected to the central encoder, e.g., via digital backhaul link with finite-capacity $C_i$ bits per c.u. A total number of transmitting antennas in the example cloud radio access network may be represented by $n_B = \Sigma_{i=1}^{N_B} n_{B,i}$, and a total number of receive antennas may be represented by $n_M = \Sigma_{k=1}^{N_M} n_{M,k}$. The set $N_B = \{1, \ldots, N_B\}$ may be a base station set, and the set $N_M = \{1, \ldots, N_M\}$ may be a mobile station set.

Figure 3:
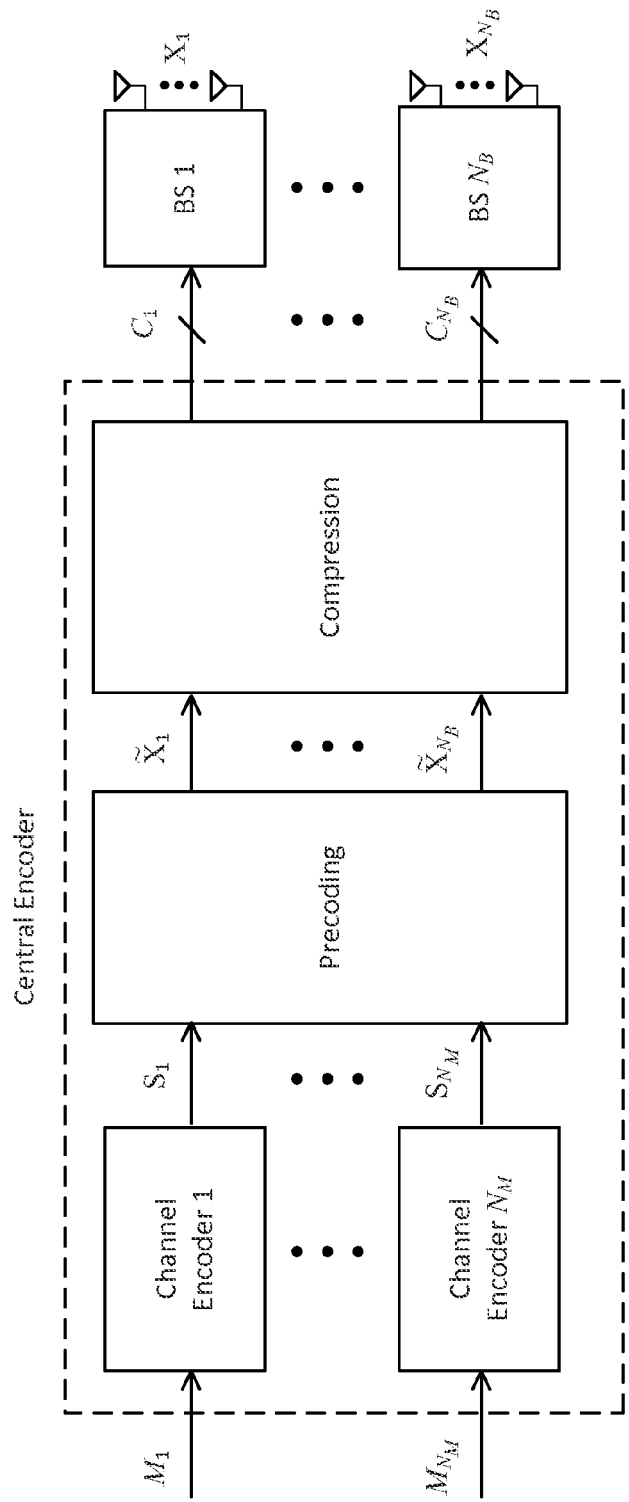
FIG. 3 illustrates the operation of an example of central encoder.

With reference to FIG. 3, each message $M_k$ may be encoded by a separate channel encoder into a coded signal $s_k$. The signal $s_k \in X^{r_k \times 1}$ may correspond to the $r_k \times 1$ vector of encoded symbols intended for the k th MS for a given c.u., and with $r_k \leq n_{M,k}$. It may be assumed that each coded symbol $s_k$ may be taken from a conventional Gaussian codebook, such that $s_k$: XN(0,I). The signals $s_1, \ldots, s_{N_M}$, may be processed by the central encoder in two stages that may include a precoding stage and a compression stage. Precoding may be used to control interference between respective data streams intended for a particular MS, and those intended for other MSs. Compression may produce $N_B$ rate-limited bit streams that may be transmitted to respective BSs, e.g., over corresponding backhaul links. Each BS i may receive up to $C_i$ bits per c.u. on a corresponding backhaul link from the central encoder.

Based on the bits received on the backhaul links, each BS i may produce a vector $x_i \in X^{n_{B,i} \times 1}$ for each c.u. that may be a baseband signal to be transmitted from its $n_{B,i}$ antennas. Per BS power constraints may be represented by $$E[\|x_1\|^2] \leq P_l, \text{ for } i \in N_B. \tag{1}$$

Results described herein may be extended to a case with more general power constraints, for example of the form $E[x^\dagger \Theta_l x] \leq \delta_l$ for $l \in \{1, \ldots, L\}$, where the matrix $\Theta_l$ may be a non-negative definite matrix.

Assuming flat-fading channels, the signal $y_k \in X^{n_{M,k}}$ received by MS k may be represented by $$y_k = H_k x + z_k, \tag{2}$$

where the aggregate transmit signal vector may be represented by $x=[x_1^\dagger, \ldots, x_{N_B}^\dagger]^\dagger$, the additive noise by $z_k$: $XN(0,I)$, and the channel matrix $H_k \in X^{n_{M,k} \times n_B}$ toward MS k by $$H_k = [H_{k,1} H_{k,2} \ldots H_{k,N_B}], \quad (3)$$

where $H_{k,i} \in X^{n_{M,k} \times n_{B,i}}$ may denote the channel matrix from BS i to MS k. Correlated noise may be accommodated by performing whitening at each MS k to obtain equation (2). The channel matrices may remain constant for the duration of the coding block. It may be assumed that the central encoder may have information about global channel matrices $H_k$ for each $k \in N_M$, and that each MS k may be aware of the channel matrix $H_k$. The BSs may be informed about one or more compression codebooks used by the central encoder. An example of imperfect CSI at the central encoder may be described herein. Based on definitions described herein, and assuming single-user detection at each MS, the rates $$R_k = I(s_k; y_k) \quad (4)$$

may be achieved for each MS $k \in N_M$.

With continued reference to FIG. 3, an example encoding operation at a central encoder is illustrated. After channel encoding, the encoded signals $s=[s_1^\dagger, \ldots, s_{N_M}^\dagger]^\dagger$ may undergo precoding and compression. The signals in vector s may be linearly precoded, e.g., via multiplication of a complex matrix $A \in X^{n_B \times n_M}$. This may allow for interference management, for example the management of interference between respective data streams intended for a particular MS, and those intended for other MSs. The precoded data may be represented by $$\tilde{x} = As, \quad (7)$$

where the matrix A may be factorized as $$A = [A_1 \ldots A_{N_M}], \quad (8)$$

where $A_k \in X^{n_B \times n_{M,k}}$ may denote the precoding matrix corresponding to MS k. The precoded data $\tilde{x}$ may be represented by $\tilde{x}=[\tilde{x}_1^\dagger, \ldots, \tilde{x}_{N_B}^\dagger]^\dagger$, where the signal $\tilde{x}_i$ may be the $n_{B,i} \times 1$ precoded vector corresponding to the i th BS, and may be represented by $$\tilde{x}_i = E_i^\dagger A s, \quad (9)$$

where the matrix $E_i \in X^{n_B \times n_{B,i}}$ may have all zero elements except for the rows from $(\Sigma_{j=1}^{i-1} n_{B,j}+1)$ to $(\Sigma_{j=1}^{i-1} n_{B,j})$, that may contain an $n_{B,i} \times n_{B,i}$ identity matrix. Non-linear precoding using DPC techniques may be considered, for example as described herein.

Each precoded data stream $\tilde{x}_i$ for $i \in N_B$ may be compressed, such that the central encoder may transmit the data stream to the i th BS through a corresponding backhaul link of capacity $C_i$ bits per c.u. Each i th BS may forward the compressed signal $x_i$ obtained from the central encoder. The BSs may not be aware of the channel codebooks used by the central encoder, and/or of the precoding matrix A used by the central encoder. The BSs may be informed about one or more quantization codebooks. The one or more quantization codebooks may be selected by the central encoder.

Using rate-distortion considerations (e.g., standard rate-distortion considerations), a Gaussian test channel may be used to model the effect of compression on a backhaul link. The compressed signals $x_i$ to be transmitted by a BS i may be represented by $$x_i = \tilde{x}_i + q_i. \quad (10)$$

where the compression noise $q_i$ may be modeled as a complex Gaussian vector distributed as $XN(0,\Omega_{i,i})$. The test channel $x_i = B_i \tilde{x}_i + q_i$ may be more general than equation (10). This may be captured by adjusting the matrix A in equation (7). The vector $x=[x_1^\dagger, \ldots, x_{N_B}^\dagger]^\dagger$ of compressed signals for each of the BSs may represented by $$x = As + q, \quad (11)$$

where the compression noise $q=[q_1^\dagger, \ldots, q_{N_B}^\dagger]^\dagger$ may be modeled as a complex Gaussian vector distributed as q: XN$(0,\Omega)$. The compression covariance $\Omega$ may be represented by $$\Omega = \begin{bmatrix} \Omega_{1,1} & \Omega_{1,2} & \ldots & \Omega_{1,N_B} \\ \Omega_{2,1} & \Omega_{2,2} & \ldots & \Omega_{2,N_B} \\ \vdots & \vdots & \ddots & \vdots \\ \Omega_{N_B,1} & \Omega_{N_B,2} & \ldots & \Omega_{N_B,N_B} \end{bmatrix}, \quad (12)$$

where the matrix $\Omega_{i,j}$ may be defined as $\Omega_{i,j}=E[q_i q_j^\dagger]$, and may define correlation between the quantization noises of BS i and BS j.

With the example precoding and compression operations described herein, the achievable rate for MS k, for example represented by equation (4), may computed as:

$$I(s_k; y_k) = f_k(A, \Omega) \quad (13)$$
$$\cong \log\det(I + H_k(AA^\dagger + \Omega)H_k^\dagger) -$$
$$\log\det\left(I + H_k\left(\sum_{l \in N_M \setminus \{k\}} A_l A_l^\dagger + \Omega\right)H_k^\dagger\right).$$

The signals $\tilde{x}_i$ corresponding to each BS i may be compressed independently. This may correspond to setting $\Omega_{i,j}=0$ for each $i \neq j$ in equation (12). Correlated compression for the signals of different BSs may be leveraged, for example to control the effect of the additive quantization noises at the MSs. The design of the precoding matrix A and of the quantization covariance $\Omega$ may be performed separately, for example using a precoder (e.g., zero-forcing (ZF) or MMSE precoding), or may be performed jointly.

One or more BSs of a cloud radio access network may be connected to a corresponding central encoder via finite-capacity backhaul links. The precoded signals $\tilde{x}_i$ as represented by equation (9) for $i \in N_B$ may be compressed before being communicated to the BSs, for example using the Gaussian test channels represented by equation (10). Where the compression noise signals related to the different BSs are uncorrelated, for example such that $\Omega_{i,j}=0$ for each $i \neq j \in N_B$, the signal $x_i$ to be emitted from BS i may be communicated from the central encoder to the BS i, for example if the condition $$I(\tilde{x}_i; x_i) = \log \det(E_i^\dagger AA^\dagger E_i + \Omega_{i,i}) - \log \det(\Omega_{i,i}) \leq C_i \quad (15)$$

is satisfied for $i \in N_B$. Equation (15) may be valid, for example, if each BS i is informed about the quantization codebook used by the central encoder, as defined by the covariance matrix $\Omega_{i,i}$.

Correlation may be introduced among the compression noise signals, for example by setting $\Omega_{i,j} \neq 0$ for $i \neq j$. This may control the effect of the quantization noise at the respective MSs. Correlated quantization noises may be introduced in accordance with joint compression of the precoded signals of different BSs. Compression techniques that produce descriptions with correlated compression noises may be referred to as multivariate compression. By choosing the test channel in accordance with equation (11), sufficient conditions may be obtained for the signal $x_i$ to be delivered to BS i for each i∈$N_B$. A matrix obtained by stacking the matrices $E_i$ for i∈Σ horizontally may be denoted by $E_Σ$.

The signals $x_1, \ldots, x_{N_B}$ obtained, for example, via the test channel represented by equation (11), may be transmitted to the BSs on the respective backhaul links, if the condition $$g_Σ(A, Ω) \triangleq \sum_{i \in Σ} h(x_i) - h(x_Σ \mid \tilde{x}) \qquad (16)$$

$$= \sum_{i \in Σ} \log\det(E_i^† AA^† E_i + Ω_{i,i}) -$$

$$\log\det(E_Σ^† Ω E_Σ) \leq \sum_{i \in Σ} C_i$$

is satisfied for each of the subsets $Σ ⊆ N_B$.

The weighted sum-rate $R_{sum} = \sum_{k=1}^{N_M} w_k R_k$ may be improved (e.g., maximized), subject to backhaul constraints, represented by equation (16), over the precoding matrix A and the compression noise covariance Ω for given weights $w_k \geq 0$, $k \in N_M$. This may be formulated as:

$$\underset{A, Ω \succeq 0}{\text{maximize}} \sum_{k=1}^{N_M} w_k f_k(A, Ω) \qquad (17a)$$

$$\text{s.t. } g_Σ(A, Ω) \leq \sum_{i \in Σ} C_i, \text{ for all } Σ \subseteq N_B, \qquad (17b)$$

$$tr(E_i^† AA^† E_i + Ω_{i,i}) \leq P_i, \text{ for all } i \in N_B. \qquad (17c)$$

Formulations (17a), (17b), and (17c) may be referred to as problem (17). The condition of (17b) may correspond to backhaul constraints due to multivariate compression. The condition (17c) may impose transmit power constraints, for example in accordance with equation (1). The objective function $\sum_{k=1}^{N_M} w_k f_k(A, Ω)$ in (17a) and the functions $g_Σ(A, Ω)$ in (17b), with respect to (A, Ω), may be non-convex.

Figure 4:
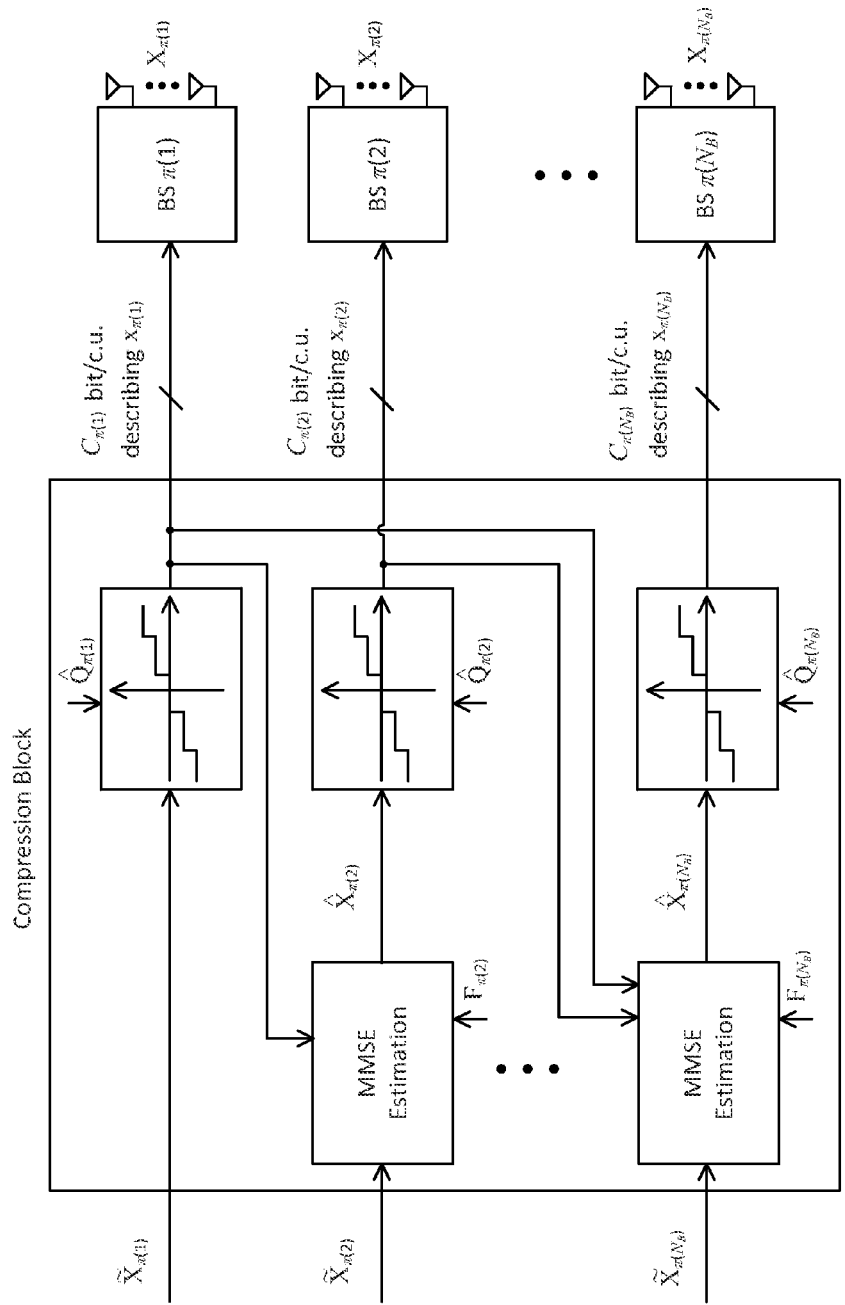
FIG. 4 illustrates an example of multivariate compression based on successive minimum mean squared error estimation and per base station compression.

FIG. 4 illustrates an example architecture for multivariate compression based on successive MMSE estimation and per BS compression. In order to obtain correlated quantization noises across BSs using multivariate compression, joint compression of each of the precoded signals $\tilde{x}_i$ corresponding to each of the BSs i for i∈$N_B$ may be performed. If the number of BSs is large, joint compression may be impractical.

A successive technique, based on MMSE estimation and per BS compression, as illustrated in FIG. 4, may be implemented. Such an implementation may work with a fixed permutation π: $N_B \to N_B$ of the indices $N_B$ of the BSs.

The central encoder may compress the signal $\tilde{x}_{π(1)}$, for example using the test channel of equation (10), such that $x_{π(1)} = \tilde{x}_{π(1)} + q_{π(1)}$, with $q_{π(1)}$: XN $(0, Ω_{π(1),π(1)})$, and may transmit the bit stream describing the compressed signal $x_{π(1)}$ over a respective backhaul link to a corresponding BS π(1). For other i∈$N_B$ with i>1, the central encoder may obtain the compressed signal $x_{π(i)}$ for BS π(i) in a successive manner in the given order π, by performing estimation and compression.

In accordance with estimation, the central encoder may obtain the MMSE estimate $\hat{x}_{π(i)}$ of $x_{π(i)}$ given the signal $\tilde{x}_{π(i)}$ and the previously obtained compressed signals $x_{π(1)}, \ldots, x_{π(i-1)}$. This estimate may be represented by $$\hat{x}_{π(i)} = E[x_{π(i)} \mid u_{π(i)}] \qquad (18)$$

$$= \sum_{x_{π(i)}, u_{π(i)}} \sum_{u_{π(i)}}^{-1} u_{π(i)},$$

where the vector may be represented by $u_{π(i)} = [x_{π(i)}^†, \ldots, x_{π(i-1)}^†, \tilde{x}_{π(i)}^†]^†$, and the correlation matrices $Σ_{x_{π(i)}, u_{π(i)}}$ and $Σ_{u_{π(i)}}$ may be represented by $$\sum_{x_{π(i)}, u_{π(i)}} = \left[ (E_{π(i)}^† AA^† E_{Σ_{π,i-1}} + Ω_{π(i),Σ_{π,i-1}}) E_{π(i)}^† AA^† E_{π(i)} \right] \qquad (19)$$

and $$\sum_{u_{π(i)}} = \begin{bmatrix} E_{Σ_{π,i-1}}^† AA^† E_{Σ_{π,i-1}} + Ω_{Σ_{π,i-1},Σ_{π,i-1}} & E_{Σ_{π,i-1}}^† AA^† E_{π(i)} \\ E_{π(i)}^† AA^† E_{Σ_{π,i-1}} & E_{π(i)}^† AA^† E_{π(i)} \end{bmatrix}, \qquad (20)$$

with $Ω_{Σ,T} = Σ^† Ω E_T$ for subsets Σ, T⊆$N_B$, and the set $Σ_{π,i}$ defined as $Z_{π,i} \triangleq \{π(1), \ldots, π(i)\}$.

In accordance with compression, the central encoder may compress the MMSE estimate $\hat{x}_{π(i)}$ to obtain $x_{π(i)}$ using the test channel $$x_{π(i)} = \hat{x}_{π(i)} + \hat{q}_{π(i)}, \qquad (21)$$

where the quantization noise $\hat{q}_{π(i)}$ may be independent of the estimate $\hat{x}_{π(i)}$, and may be distributed as $\hat{q}_{π(i)}$: XN(0, $Σ_{x_{π(i)} \mid \tilde{x}_{π(i)}}$, with $$\sum_{x_{π(i)} \mid \tilde{x}_{π(i)}} = \sum_{x_{π(i)} \mid u_{π(i)}} \qquad (22)$$

$$= Ω_{π(i),π(i)} - Ω_{π(i),Σ_{π,i-1}} Ω_{Σ_{π,i-1},Σ_{π,i-1}}^{-1} Ω_{π(i),Σ_{π,i-1}}^†.$$

The first equality in equation (22) may follow, for example, if the MMSE estimate $\hat{x}_{π(i)}$ may be a sufficient statistic for the estimation of $x_{π(i)}$ from $u_{π(i)}$. The compression rate $I(\hat{x}_{π(i)}; x_{π(i)})$, which may be used by the test channel of equation (21), may be represented by:

$$I(x_{π(i)}; \hat{x}_{π(i)}) = h(x_{π(i)}) - h(x_{π(i)} \mid \hat{x}_{π(i)}) \qquad (23)$$

$$= \log\det(E_{π(i)}^† AA^† E_{π(i)} + Ω_{π(i),π(i)}) -$$

$$\log\det(Ω_{π(i),π(i)} - Ω_{π(i),S_{π,i-1}} Ω_{S_{π,i-1},S_{π,i-1}}^{-1} Ω_{π(i),S_{π,i-1}}^†).$$

To illustrate, in an example of multivariate compression based on successive MMSE estimation and per base station compression, a cloud radio access network may include a central encoder and three base stations (e.g., such that $N_B = 3$) that may be connected to the central encoder via respective backhaul links. The central encoder may receive first, second, and third signals (e.g., $x_{π(1)}, x_{π(2)}, x_{π(3)}$) that correspond to the first, second, and third base stations, respectively. The central encoder may precode the first, second, and third signals into respective, first, second, and third precoded signals (e.g., $\tilde{x}_{π(1)}, \tilde{x}_{π(2)}, \tilde{x}_{π(3)}$).

The central encoder may quantize (e.g., compress) the first signal into a first quantized signal. The central encoder may generate a first MMSE estimate that may be based on the quantized first signal and the second precoded signal. The central encoder may quantize the second precoded signal into a second quantized signal. The first MMSE estimate may be applied during quantization of the second precoded signal. The central encoder may generating a second MMSE estimate that may be based on the first quantized first signal, the second quantized signal, and the third precoded signal. The second MMSE estimate may be applied during quantization of the third precoded signal. The central encoder may transmit the first, second, and third quantized signals.

In an example, the precoding matrix A and the compression covariance Rf may be jointly improved (e.g., optimized), for example by solving equations (17). In another example, the precoding matrix may be fixed, for example by using ZF, MMSE, or weighted sum-rate maximizing precoding by neglecting the compression noise, and the compression noise matrix $\Omega$ may be improved (e.g., optimized).

With reference to the above illustrated example, precoding the first, second, and third signals may include designing respective optimized precoding matrices for the first, second, and third signals, and applying the optimized precoding matrices to the first, second, and third signals. Precoding the first signal and quantizing the first precoded signal may be performed concurrently, precoding the second signal and quantizing the second precoded signal may be performed concurrently, and precoding the third signal and quantizing the third precoded signal may be performed concurrently, for example in succession.

The optimization of problem (17) may be non-convex. The variables $R_k \approx A_k A_k^\dagger$ may be defined for $k \in N_M$. The functions $f_k(\{R_j\}_{j=1}^{N_M}, \Omega)$ and $g_\Sigma(\{R_k\}_{k=1}^{N_M}, \Omega)$ may be defined with respect to the variables $\{R_k\}_{k=1}^{N_M}$, which may be obtained by substituting $R_k = A_k A_k^\dagger$ into the functions $f_k(A,\Omega)$ and $g_\Sigma(A,\Omega)$ in problem (17), respectively. The transmit power constraint may be defined as $\mathrm{tr}(\Sigma_{k=1}^{N_M} E_i^\dagger R_k E_i + \Omega_{i,i}) \le P_i$ for $i \in N_B$. The variables $\{R_k\}_{k=1}^{N_M}$ and $\Omega$ may be non-convex, for example due to the second term in $f_k(\{R_j\}_{j=1}^{N_M}, \Omega)$ and the first term in $g_\Sigma(\{R_k\}_{k=1}^{N_M}, \Omega)$, which may be concave in the variables $\{R_k\}_{k=1}^{N_M}$ and $\Omega$. The Majorization Minimization (MM) algorithm may be used to solve a sequence of convex problems obtained by linearizing non-convex parts in the objective function $f_k(\{R_j\}_{j=1}^{N_M}, \Omega)$ and the constraint function $g_\Sigma(\{R_k\}_{k=1}^{N_M}, \Omega)$. It may be shown that the MM algorithm may converge to a stationary point of the original non-convex problems.

The algorithm may be summarized as, for example where the functions $f_k'(\{R_j^{(t+1)}\}_{j=1}^{N_M}, \Omega^{(t+1)}, \{R_j^{(t)}\}_{j=1}^{N_M}, \Omega^{(t)})$ and $g_\Sigma'(\{R_j^{(t+1)}\}_{j=1}^{N_M}, \Omega^{(t+1)}, \{R_j^{(t)}\}_{j=1}^{N_M}, \Omega^{(t)})$ may be defined as $$f_k'(\{R_j^{(t+1)}\}_{j=1}^{N_M}, \Omega^{(t+1)}, \{R_j^{(t)}\}_{j=1}^{N_M}, \Omega^{(t)}) \cong \qquad (25)$$

$$\mathrm{logdet}\left(I + H_k\left(\sum_{j=1}^{N_M} R_j^{(t+1)} + \Omega^{(t+1)}\right) H_k^\dagger\right) -$$

$$\varphi\left(I + H_k\left(\sum_{j=1, j\ne k}^{N_M} R_j^{(t+1)} + \Omega^{(t+1)}\right) H_k^\dagger, I + H_k\left(\sum_{j=1, j\ne k}^{N_M} R_j^{(t)} + \Omega^{(t)}\right) H_k^\dagger\right)$$

and $$g_\Sigma'(\{R_j^{(t+1)}\}_{j=1}^{N_M}, \Omega^{(t+1)}, \{R_j^{(t)}\}_{j=1}^{N_M}, \Omega^{(t)}) \cong \qquad (26)$$

$$\varphi\left(\sum_{j=1}^{N_M} E_i^\dagger R_j^{(t+1)} E_i + \Omega_{i,i}^{(t+1)}, \sum_{j=1}^{N_M} E_i^\dagger R_j^{(t)} E_i + \Omega_{i,i}^{(t)}\right) - \mathrm{logdet}(E_\Sigma^\dagger \Omega^{(t+1)} E_\Sigma),$$

with the function $\varphi(X,Y)$ represented by $$\varphi(X, Y) \cong \mathrm{logdet}(Y) + \frac{1}{\ln 2}\mathrm{tr}(Y^{-1}(X - Y)). \qquad (27)$$

An example MM algorithm for problem (17) may include performing one or more of the following processes. First, the matrices $\{R_k\}_{k=1}^{N_M}$ and $\Omega^{(1)}$ may be initialized to arbitrary feasible positive semidefinite matrices for problem (17) and t may be set to $t=1$.

Second, the matrices $\{R_k^{(t+1)}\}_{k=1}^{N_M}$ and $\Omega^{(t+1)}$ may be updated as a solution of a problem, for example a convex problem represented by $$\max_{\{R_k^{(t+1)} \succeq 0\}_{k=1}^{N_M}, \Omega^{(t+1)} \succeq 0} \sum_{k=1}^{N_M} w_k f_k'(\{R_j^{(t+1)}\}_{j=1}^{N_M}, \Omega^{(t+1)}, \{R_j^{(t)}\}_{j=1}^{N_M}, \Omega^{(t)}) \qquad (28)$$

$$\mathrm{s.t.} \quad g_\Sigma'(\{R_j^{(t+1)}\}_{j=1}^{N_M}, \Omega^{(t+1)}, \{R_j^{(t)}\}_{j=1}^{N_M}, \Omega^{(t)}) \le \sum_{i\in\Sigma} C_i,$$

$$\mathrm{for\ all}\ \Sigma \subseteq N_B,$$

$$\mathrm{tr}\left(\sum_{k=1}^{N_M} E_i^\dagger R_k^{(t+1)} E_i + \Omega_{i,i}^{(t+1)}\right) \le P_i, \ \mathrm{for\ all}\ i \in N_B.$$

Third if a convergence criterion is not satisfied, t may be set to $t \leftarrow t+1$ and the second process of updating the matrices $\{R_k^{(t+1)}\}_{k=1}^{N_M}$ and $\Omega^{(t+1)}$ may be repeated. If the convergence criterion is satisfied, the example algorithm may proceed to a fourth process.

Fourth, precoding matrices $A_k \leftarrow V_k D_k^{1/2}$ may be calculated for $k \in N_M$, where $D_k$ is a diagonal matrix whose diagonal elements may be the nonzero eigenvalues of $R_k^{(t)}$, and the columns of $V_k$ are the corresponding eigenvectors.

Given the solution $(A, \Omega)$, for example as obtained with the example algorithm, the central encoder may perform joint compression to obtain the signals $x_i$ to be transmitted by the BSs. If one or more subsets of the inequalities in (17b) are satisfied with equality, and the one or more subsets correspond to the subsets $\Sigma = \{\pi(1)\}$, $\{\pi(1), \pi(2)\}$, ..., $\{\pi(1), \ldots, \pi(N_B)\}$ for a given permutation $\pi$, the successive estimation-compression structure of FIG. 4 may be used without loss of optimality. A compression technique that is characterized by the calculated covariance $\Omega$ may be implemented, for example by employing the implementation of FIG. 4 with the obtained ordering $\pi$.

A weighted sum-rate maximization with independent quantization noises may be formulated as problem (17) with additional constraints represented by $$\Omega_{i,j}=0, \ \mathrm{for\ all}\ i\ne j \in N_B. \qquad (29)$$

The constraints (29) are affine, and the example MM algorithm may be applicable by setting to zero matrices $\Omega_{i,j}=0$ for $i \ne j$.

The central encoder may have information about the global channel matrices $H_k$ for $k \in N_M$. In the presence of uncertainty at the central encoder regarding the channel matrices $H_k$ for $k \in N_M$, a robust design of the precoding matrix A and the compression covariance $\Omega$ may be implemented. Deterministic, worst-case optimization may be described under different uncertainty models, for example a singular value uncertainty model or an ellipsoidal uncertainty model. The singular value uncertainty model may be related via appropriate bounds to normed uncertainty on the channel matrices. The ellipsoidal uncertainty model may be more accurate when knowledge of the covariance matrix of the CSI error, due, for example, to estimation, is available.

Deterministic worst-case optimization may be described under a singular value uncertainty model. Considering a multiplicative uncertainty model, the actual channel matrix $H_k$ toward each MS k may be modeled as $$H_k = \hat{H}_k(I+\Delta_k), \quad (30)$$

where the matrix $\hat{H}_k$ may be the CSI known at the central encoder, and the matrix $\Delta_k \in X^{n_B \times n_B}$ may account for the multiplicative uncertainty matrix. The multiplicative uncertainty matrix may be bounded as $$\sigma_{max}(\Delta_k) \le \epsilon_k < 1, \quad (31)$$

where $\sigma_{max}(X)$ may be the largest singular value of matrix X. The worst-case weighted sum-rate may be maximized over each of the possible uncertainty matrices $\Delta_k$ for $k \in N_M$, subject to the backhaul capacity (17b) and power constraints (17c), for example $$\underset{A, \Omega \succeq 0}{\text{maximize}} \underset{\{\Delta_k \, s.t.(??)\}_{k=1}^{N_M}}{\min} \sum_{k=1}^{N_M} w_k f_k(A, \Omega) \quad (32a)$$

$$\text{s.t. } g_\Sigma(A, \Omega) \le \sum_{i \in \Sigma} C_i, \text{ for all } \Sigma \subseteq N_B, \quad (32b)$$

$$tr(E_i^\dagger AA^\dagger E_i + \Omega_{i,i}) \le P_i, \text{ for all } i \in N_B. \quad (32c)$$

Formulations (32a), (32b), and (32c) may be referred to as problem (32). The problem (32) may be equivalent to the problem (17), with the channel matrix $H_k$ replaced with $(1-\epsilon_k)\hat{H}_k$ for $k \in N_M$. Based on this, the problem (32) may be solved by using the MM algorithm, with a change of the channel matrices from $\{H_k\}_{k=1}^{N_M}$ to $\{(1-\epsilon_k)\hat{H}_k\}_{k=1}^{N_M}$.

Deterministic worst-case optimization may be described under an ellipsoidal uncertainty model. In an example ellipsoidal uncertainty model, a multiple-input single-output (MISO) case may be used, where each MS may be equipped with a single antenna, such that $n_{M,k}=1$ for $k \in N_M$. The channel vector corresponding to each MS k may be denoted by $H_k = h_k^\dagger \in X^{1 \times n_B}$. The actual channel $h_k$ may be modeled as:

$$h_k = \hat{h}_k + e_k, \quad (33)$$

with $\hat{h}_k$ and $e_k$ being the presumed CSI available at the central encoder and the CSI error, respectively. The error vector $e_k$ may be assumed to be bounded within an ellipsoidal region that may be described as $$e_k^\dagger C_k e_k \le 1, \quad (34)$$

for $k \in N_M$ with the matrix $C_k \succ 0$ specifying a size and shape of the ellipsoid.

A dual problem of power minimization under signal-to-interference-plus-noise ratio (SINR) constraints for each of the MSs, may be stated as:

$$\underset{\{R_k \succeq 0\}_{k=1}^{N_M}, \Omega \succeq 0}{\text{minimize}} \sum_{i=1}^{N_B} \mu_i \cdot tr\left(\sum_{k=1}^{N_M} E_i^\dagger R_k E_i + \Omega_{i,i}\right) \quad (35a)$$

$$\text{s.t. } \frac{h_k^\dagger R_k h_k}{\sum_{j \in N_M \setminus \{k\}} h_k^\dagger R_j h_k + h_k^\dagger \Omega h_k + 1} \ge \Gamma_k, \quad (35b)$$

for all $e_k$ with (34) and $k \in N_M$, $$g_S(A, \Omega) \le \sum_{i \in S} C_i, \text{ for each } S \subseteq N_B, \quad (35c)$$

where the coefficients $\mu_i \ge 0$ are arbitrary weights, $\Gamma_k$ may be the SINR constraint for MS k, and $R_k \approx A_k A_k^\dagger$ for $k \in N_M$. Formulations (35a), (35b), and (35c) may be referred to as problem (35). Problem (35) may have an infinite number of constraints is (35b). Following the S-procedure, the constraints of (35b) may be translated into a finite number of linear constraints by introducing auxiliary variables $\beta_k$ for $k \in N_M$.

The constraints (35b) may hold if constants, $\{\beta_k \ge 0\}_{k=1}^{N_M}$ exist, such that the condition $$\begin{bmatrix} \Xi_k & \Xi_k \hat{h}_k \\ \hat{h}_k^\dagger \Xi_k & \hat{h}_k^\dagger \Xi_k \hat{h}_k - \Gamma_k \end{bmatrix} - \beta_k \begin{bmatrix} C_k & 0 \\ 0 & -1 \end{bmatrix} \succeq 0 \quad (36)$$

is satisfied for each of the $k \in N_M$, where $\Theta_k = R_k - \Gamma_k \Sigma_{j \in N_M / \{k\}} R_j - \Gamma_k \Omega$ have been defined for $k \in N_M$.

By transforming the constraint (35b) into the condition (36), a resulting problem may fall in the class of DC problems. An MM algorithm, for example similar to the MM algorithm described herein, may be derived by linearizing the non-convex terms in the constraint (35c). The algorithm may converge to a stationary point of problem (35).

Design of precoding and compression may be performed separately. The precoding matrix A may be fixed, for example in accordance with ZF precoding, MMSE precoding, or weighted sum-rate maximizing precoding by neglecting compression noise. The compression covariance $\Omega$ may be designed separately, so as to maximize the weighted sum-rate.

The precoding matrix A may be selected according to a criterion (e.g., a standard criterion), by neglecting the compression noise. The precoding matrix A may be designed by assuming a reduced power constraint, for example $\gamma_i P_i$ for some $\gamma_i \in (0,1)$, for $i \in N_B$. The power offset factor $\gamma_i \in (0,1)$ may be used. The final signal $x_i$ transmitted by each BS i may be represented by equation (10), and may be the sum of the precoded signal $E_i^\dagger As$ and the compression noise $q_i$. If the power of the precoded part $E_i^\dagger As$ is selected to be equal to the power constraint $P_i$, the compression noise power may be forced to be zero. This may be possible when the backhaul capacity may grow to infinity, for example due to (17b). To make the compression feasible, the parameters $\gamma_i, \ldots, \gamma_{N_B}$ may be selected based on the backhaul constraints.

Having fixed the precoding matrix A, the problem may reduce to solving problem (17) with respect to the compression covariance $\Omega$. The obtained problem may be a DC problem which may be solved, for example, using the example MM algorithm described herein, by limiting the optimization to matrix $\Omega$. This problem may not be feasible if the parameters $\gamma_i$, $i \in N_B$, are too large. These parameters may be set using one or more search strategies, such as bisection.

Figure 5:
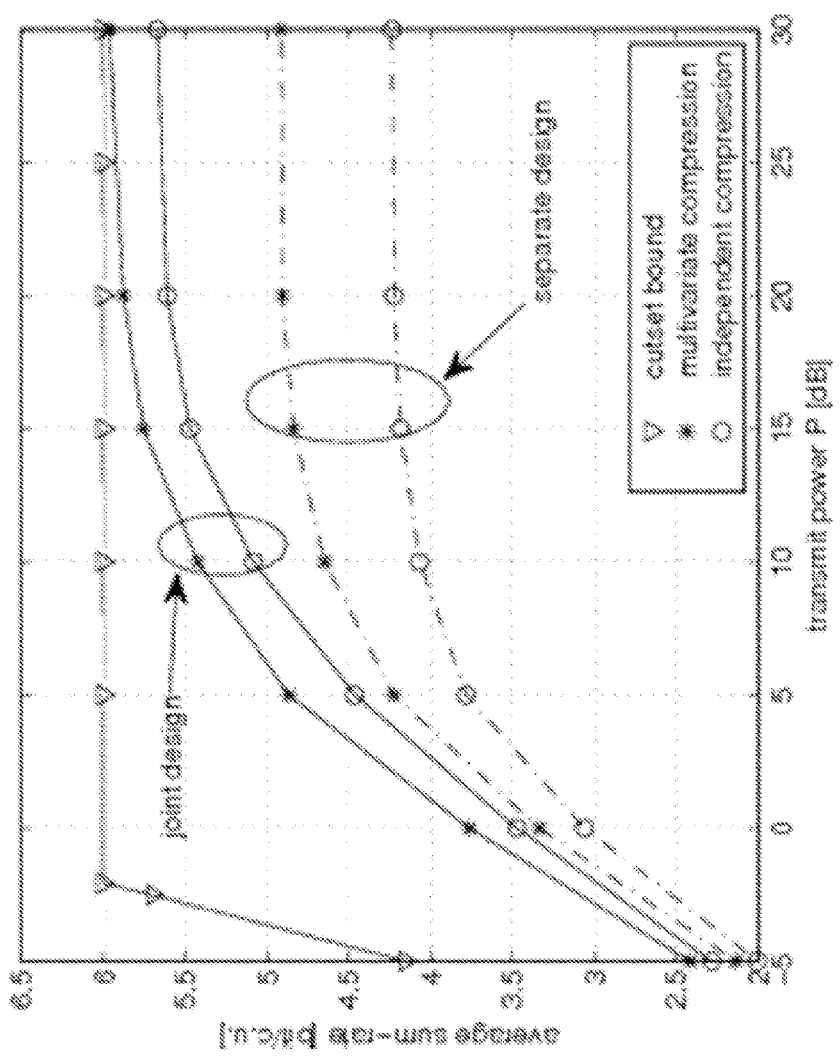
FIG. 5 is a graph depicting average sum rate performance versus transmit power for an example of linear precoding and compression.

FIG. 5 is a graph depicting average sum rate performance versus transmit power for an example of linear precoding and compression. As shown, the average sum-rate performance of the example linear precoding and compression versus the transmit power P is plotted with C=2 bit/c.u. and $\alpha$=0 dB. As the graph of FIG. 5 illustrates, the gain of multivariate compression may be more pronounced when each BS uses a larger transmit power. As the received SNR increases, more efficient compression strategies may be utilized. Multivariate compression may be effective in compensating for the deficiencies of separate design.

In FIG. 5, the cutset bound is plotted. The cutset bound may be obtained as min{$R_{full}$,3C}, where $R_{full}$ may be the sum-capacity achievable when the BSs may cooperate under per BS power constraints. The rate $R_{full}$ may be obtained using the inner-outer iteration algorithm. As is illustrated in FIG. 5, the example joint design with multivariate compression may approach the cutset bound as the transmit power increases.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, terminal, base station, RNC, or any host computer.

What is claimed:

1. A method of compression encoding, the method comprising:
    precoding, by a central encoding device, a first signal into a first precoded signal;
    precoding, by the central encoding device, a second signal into a second precoded signal;
    quantizing, by the central encoding device, the first precoded signal into a first quantized signal;
    generating, by the central encoding device, a minimum mean squared error (MMSE) estimate based on the first quantized signal and the second precoded signal;
    quantizing, by the central encoding device, the second precoded signal into a second quantized signal, wherein quantizing the second precoded signal includes applying the MMSE estimate to the second precoded signal; and
    transmitting, by the central encoding device, the first and second quantized signals.

2. The method of claim 1, wherein precoding the first signal includes the central encoding device designing a first optimized precoding matrix for the first signal and applying the first optimized precoding matrix to the first signal.

3. The method of claim 2, wherein precoding the second signal includes the central encoding device designing a second optimized precoding matrix for the second signal and applying the second optimized precoding matrix to the second signal.

4. The method of claim 1, wherein the first quantized signal is transmitted to a first base station and the second quantized signal is transmitted to a second base station.

5. The method of claim 1, further comprising:
    precoding, by the central encoding device, a third signal into a third precoded signal;
    generating, by the central encoding device, a second MMSE estimate based on the first quantized first signal, the second quantized signal, and the third precoded signal; and
    quantizing, by the central encoding device, the third precoded signal into a third quantized signal, wherein quantizing the third precoded signal includes applying the second MMSE estimate to the third precoded signal; and
    transmitting, by the central encoding device, the third quantized signal.

6. The method of claim 5, wherein the first quantized signal is transmitted to a first base station, the second quantized signal is transmitted to a second base station, and the third quantized signal is transmitted to a third base station.

7. A central encoding device comprising:
    a memory comprising instructions; and
    a processor that, upon executing the instructions, is configured to:
        precode a first signal into a first precoded signal;
        precode a second signal into a second precoded signal;
        quantize the first precoded signal into a first quantized signal;
        generate a minimum mean squared error (MMSE) estimate based on the first quantized signal and the second precoded signal;
        quantize the second precoded signal into a second quantized signal, wherein quantizing the second precoded signal includes applying the MMSE estimate to the second precoded signal; and
        transmit the first and second quantized signals.

8. The central encoding device of claim 7, wherein precoding the first signal includes designing a first optimized precoding matrix for the first signal and applying the first optimized precoding matrix to the first signal.

9. The central encoding device of claim 8, wherein precoding the second signal includes designing a second optimized precoding matrix for the second signal and applying the second optimized precoding matrix to the second signal.

10. The central encoding device of claim 7, wherein the first quantized signal is transmitted to a first base station and the second quantized signal is transmitted to a second base station.

11. The central encoding device of claim 7, wherein the processor, upon executing the instructions, is further configured to:
    precode a third signal into a third precoded signal;
    generate a second MMSE estimate based on the first quantized signal, the second quantized signal, and the third precoded signal;
    quantize the third precoded signal into a third quantized signal, wherein quantizing the third signal includes applying the second MMSE estimate to the third precoded signal; and
    transmit the quantized third signal.

12. The central encoding device of claim 11, wherein the first quantized signal is transmitted to a first base station, the second quantized signal is transmitted to a second base station, and the third quantized signal is transmitted to a third base station.

* * * * *